Oct. 24, 1961        A. FERRI        3,005,607

APPARATUS FOR COOLING OF SUPERSONIC AIRCRAFT

Filed Feb. 18, 1957

INVENTOR
ANTONIO FERRI

BY
Curtis, Morris & Safford
ATTORNEYS:

United States Patent Office 3,005,607
Patented Oct. 24, 1961

3,005,607
APPARATUS FOR COOLING OF SUPERSONIC AIRCRAFT
Antonio Ferri, Rockville Centre, N.Y., assignor to Gruen Applied Science Laboratories, Inc., Hempstead, N.Y., a corporation of New York
Filed Feb. 18, 1957, Ser. No. 640,935
2 Claims. (Cl. 244—117)

This invention relates to an apparatus for cooling of a supersonic aircraft, and particularly the skin of the fuselage thereof.

When an aircraft travels through the earth's atmosphere at speeds in excess of the speed of sound, the impact or friction between the aircraft and the molecules of air through which the aircraft is moving heat the skin of the aircraft. Unless measures were taken to cool the skin of the aircraft, there would be a definite limitation on the speed of the aircraft. If this maximum speed were exceeded, the structural strength of the skin would be impaired, and, indeed, at very high speeds the temperatures would be high enough to melt the metal of the skin if it did not break apart first.

For example, when an aluminum-skinned aircraft reaches a wall temperature above 400° F., the structural strength of the aluminum is seriously impaired and the parts of the skin which are under stress might fail unless they have been structurally designed to provide a considerable margin of safety. This would require that the aircraft be made considerably heavier than would be required if the wall temperature were kept below the indicated temperature. Titanium retains most of its structural strength up to 900° for short time loadings while some special steels can safely take up to 1200° F. for short time loadings. However, above such temperatures, these materials must be cooled in order to prevent serious impairment of their structural strength.

Heretofore, various devices have been employed for cooling the skin of a supersonic aircraft. Most of these prior devices have consisted of more or less conventional mechanical refrigerating plants which have been installed within the aircraft and arranged so as to cool the skin of the aircraft from within. These prior cooling devices not only have been very inefficient, but they have been complicated and expensive and they have added substantially to the gross weight of the aircraft. Moreover they have derived their power from the main power plant of the aircraft, substantially reducing the net power available for propulsion.

It is among the objects of the present invention to provide a system for cooling of aircraft in supersonic flight which obviates the aforementioned disadvantages of previous systems. It is a further object to provide a cooling apparatus which is simple, inexpensive and efficient, which does not greatly increase the gross weight of the aircraft, and which does not place an excessive load on the main power plant of the aircraft or seriously interfere with the aerodynamic characteristics of the aircraft.

Figure 1:
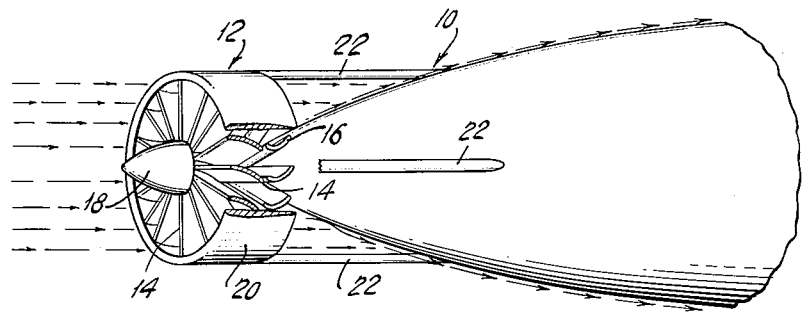
FIGURE 1 is a fragmentary isometric view of the nose of an aircraft incorporating a cooling apparatus utilizing principles of this invention, with certain parts of the apparatus being shown broken away to reveal its inner construction.
Figure 2:
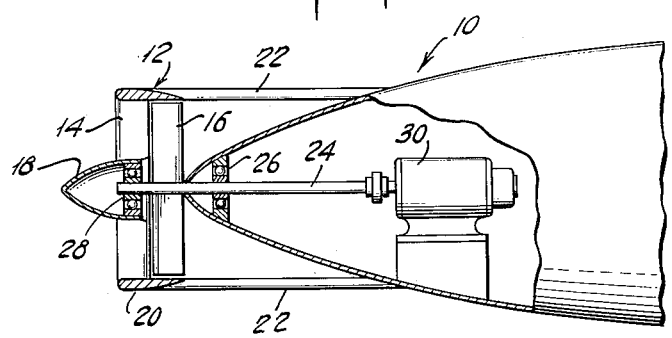
FIGURE 2 is an enlarged fragmentary elevational view of the apparatus shown in FIGURE 1, with a portion of the apparatus being shown in section.

The cooling device shown in FIGURES 1 and 2 is mounted at the nose 10 of the fuselage of the aircraft and is generally indicated by the reference numeral 12. In general terms, it comprises a turbine which, in the particular embodiment shown in FIGURES 1 and 2, has a single stage of fixed vanes 14 and a single rotor 16. The fixed vanes 14 extend radially between a generally conical nose 18 at the axis of the turbine, and a generally cylindrical outer ring 20. The outer ring 20 is supported by means of struts 22 which extend rearwardly from its trailing edge to the nose 10 of the aircraft. The rotor 16 is fixed on a shaft 24 which is rotatably journalled in bearings 26 in the nose 10 of the aircraft fuselage and in bearings 28 in the nose 18 of the turbine 12.

As best seen in FIGURE 1, the fixed vanes 14 are curved in cross-section so that the air passing between them will be deflected—i.e. it will be given a lateral component of movement. The vanes of the rotor 16 are also curved in cross-section but are oppositely oriented, so that the air directed against them will impart rotation to the rotor 16.

In a typical example, the rotor 16 has a diameter of eight inches and is driven at 36,000 r.p.m. This will give the rotor a tip speed of approximately 1260 feet per second.

The turbine 16, in causing the air which passes through it to perform work, reduces the total or stagnation temperature and enthalpy of the air and its capability to heat the aircraft.

The "total temperature" is defined as the static temperature (i.e. the temperature which could be measured in still air), plus the kinetic temperature (i.e. the increase in its energy level due to its movement relative to the aircraft). More specifically the formula for total temperature of a gas is $T_t = T_s + V^2/2C_pK$, wherein $T_t$ is the total temperature, $T_s$ is the static temperature, $V$ is the velocity of the gas (here, the air speed of the aircraft), $C_p$ is the specific heat of the gas at constant pressure, and $K$ is a coefficient of proportionality (a factor for converting to the desired unit of measurement).

For the case of an aircraft flying through air, the ratio between the total temperature of the air and its static temperature is $T_t/T_s = 1 + 0.2M^2$, wherein $M$ is the Mach number, i.e. the airspeed divided by the speed of sound.

Stated another way, "total temperature" is the temperature which the air would have if it were decelerated from its velocity relative to the aircraft to a velocity of zero.

It is this "deceleration" of the air due to impact or friction with the aircraft which increases the temperature of the skin of the aircraft. In other words, the kinetic energy of the air is converted into heat. In this analysis, conventional "wind tunnel" terminology is employed—i.e. it is assumed that the air is moving and that aircraft is stationary.

By way of example, let us assume that the aircraft is flying at such an altitude and air speed that the total temperature of the air is 2340° R. (1880° F.). Under typical conditions, the temperature of the skin of the aircraft might be approximately 1600° R. (1140° F.). This temperature would be above the indicated maximum value for any of the metals referred to hereinabove, and such speeds at such altitudes would not be practical unless means were employed to cool the skin of the aircraft.

The turbine 12 reduces the total temperature of the air before it strikes or passes near the skin of the aircraft by causing the air to perform work, i.e. drive the turbine. In other words, some of the kinetic energy of the air is converted into work.

A turbine 12 of the type and dimensions referred to hereinabove would have the effect of lowering the total temperature of the air passing through the turbine to an approximate level of 1170° R. (710° F.). This would of course reduce the temperature to which the skin of the aircraft is heated. Under the conditions described, a reduction of the skin temperature to approximately 1,000° R. (540° F.) could be achieved. This value is within the permissible limits of titanium and stainless steel and would even permit the use of aluminum if a moderate degree of supplemental cooling were provided.

For example, assume that it is desired to maintain the skin of the aircraft at a maximum temperature of 750° R. (290° F.), which would be well within the permissible range for aluminum, and assume further that the boundary layer of air at the skin of the aircraft is turbulent (which would increase the heat transfer between the air and the skin of the aircraft). Without the turbine, 750 B.t.u. per second must be removed from the skin of the aircraft to maintain it at a temperature below the indicated maximum. With a turbine of the type and size described hereinabove, it would be necessary to remove only 120 B.t.u. per second in order to maintain the skin within the temperature tolerance.

A 12-inch rotor of the type described could for example, be designed for operation at 10,000 horsepower at Mach 6 and 70,000 feet elevation. This power could, of course, be applied to some useful purpose.

In the illustrative embodiment of FIGURES 1 and 2, the shaft 24 of the turbine 12 is shown coupled to a driven mechanism, which is diagrammatically indicated at 30. By way of example, this driven unit 30 is a mechanical refrigerating unit. It also could be an electrical generator. The electric power developed by the generator could then be used to power electrical equipment within the aircraft, or to drive an electrically powered mechanical refrigerating unit used to provide supplemental cooling of the fuselage or to cool the cabin or other portions of the aircraft.

Figure 3:
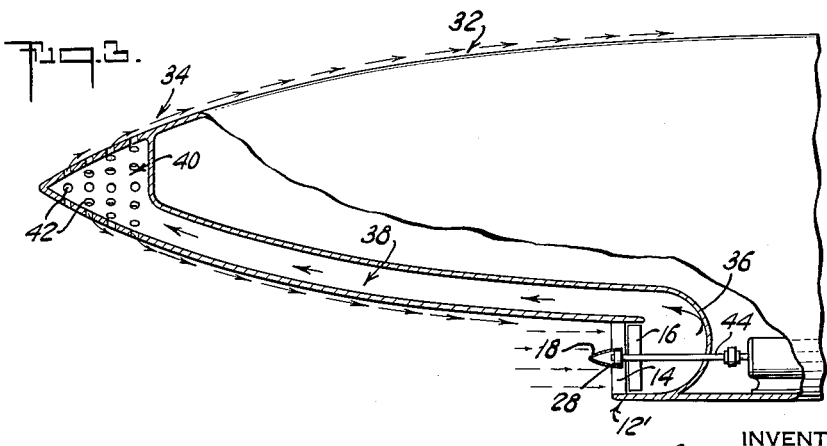
FIGURE 3 is a fragmentary elevational view of the nose of an aircraft incorporating a cooling apparatus constituting an alternative embodiment of the principles of the invention, with certain parts being shown broken away.

FIGURE 3 illustrates an alternative embodiment of the principles of this invention, which may be employed where it is desired to keep the nose of the aircraft clear, for example, as a location for a radar scanner. In this embodiment, a turbine 12' similar to the turbine 12 of FIGURES 1 and 2 is located alongside the fuselage 32 of the aircraft, some distance abaft the nose 34. Positioned behind the turbine 12' for receipt of the air passing therethrough is an air scoop 36 communicating with a duct 38 which extends forwardly of the fuselage along the interior thereof and communicates with a plenum chamber 40 in the nose. The wall of the nose 34 is provided with a plurality of spaced discharge openings 42 through which the air which has passed through the turbine 12' and has been collected by the air scoop 36 may be discharged. This air will have been subjected to cooling in the manner described hereinbefore. The discharge of this relatively cooler air at the nose of the aircraft reduces the temperature of the skin of the aircraft. In effect it forms a more or less continuous boundary layer of air around the skin of the fuselage which to some extent insulates the fuselage from the uncooled outer air. The shaft 44 of the turbine may, of course, be coupled to drive a unit 30, such as a generator or compressor, as hereinabove described.

Although the presence of the turbine in the air stream has a tendency per se to increase the drag of the aircraft, the cooling of the skin of the aircraft which is effected by the turbine at least partially offsets this tendency to increase the drag by reducing the skin resistance and therefore the drag. This reduction in drag may be quite substantial and may, for all practical purposes, remove any aerodynamic objections to the presence of the turbine.

The present invention provides a much more efficient method and apparatus for reducing the temperature of the skin of the aircraft than conventional systems wherein heat is removed directly from the skin rather than from the air. This is because conventional refrigeration of the skin increases the temperature differential between the air and the skin and increases the heat transfer between the two. Thus, the more heat is taken directly out of the skin by refrigeration, the more heat is transferred to the skin from the air. Such refrigeration thus aggravates the problem in its attempt to eliminate it.

On the other hand, removal of some of the heat from the air before it reaches the skin of the aircraft reduces the temperature differential between the air and the skin and decreases the heat transfer. Thus, not only is heat removed from the air, but the efficiency of transfer of the heat from the air to the skin is also reduced.

From the foregoing description, it will be appreciated that the present invention provides a method and apparatus by which the aforementioned and other desirable objectives have been achieved. However, it should be emphasized that the particular embodiments of the invention which are shown and described herein are intended as merely illustrative of the principles of the invention rather than as restrictive of the coverage of this patent, which is limited only by the appended claims.

I claim:

1. In a supersonic aircraft, apparatus for reducing the temperature of the skin of said aircraft in flight comprising a turbine rotor mounted in front of the nose portion of the fuselage of said aircraft for rotation by the airstream on an axis substantially coincident with the axis of said nose portion whereby the air passing through said turbine rotor will be directed along the skin of the fuselage of said aircraft, and an internal load driven by said turbine whereby the effective temperature of the air passing along the skin of said aircraft is reduced.

2. Apparatus as in claim 1 wherein said internal load comprises a refrigerating unit.

References Cited in the file of this patent

UNITED STATES PATENTS

| | | |
|---|---|---|
| 1,818,588 | Snee et al. | Aug. 11, 1931 |
| 2,561,303 | Whittle | July 17, 1951 |